(12) United States Patent
Kehl

(10) Patent No.: US 11,739,455 B2
(45) Date of Patent: Aug. 29, 2023

(54) VENTILATION VALVE AND CONTROL SYSTEM FOR VENTING FRESH AIR WITHIN A LAUNDRY APPLIANCE

(71) Applicant: WHIRLPOOL CORPORATION, Benton Harbor, MI (US)

(72) Inventor: Dennis Kehl, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 125 days.

(21) Appl. No.: 17/244,049

(22) Filed: Apr. 29, 2021

(65) Prior Publication Data

US 2022/0349101 A1    Nov. 3, 2022

(51) Int. Cl.
*D06F 25/00* (2006.01)
*D06F 37/26* (2006.01)
*F16K 15/14* (2006.01)

(52) U.S. Cl.
CPC .............. *D06F 25/00* (2013.01); *D06F 37/26* (2013.01); *F16K 15/14* (2013.01)

(58) Field of Classification Search
CPC ......... D06F 25/00; D06F 37/26; D06F 37/267
See application file for complete search history.

(56) References Cited

U.S. PATENT DOCUMENTS

| | | | |
|---|---|---|---|
| 7,246,510 B2 | 7/2007 | Kim et al. | |
| 7,325,423 B2 | 2/2008 | No et al. | |
| 7,350,380 B2 | 4/2008 | Kim et al. | |
| 8,739,577 B2 * | 6/2014 | Kwak | D06F 37/26 68/13 R |
| 9,181,647 B2 * | 11/2015 | Eglmeier | D06F 37/267 |
| 11,377,773 B2 * | 7/2022 | Park | D06F 39/083 |
| 2007/0017257 A1 | 1/2007 | Bolduan et al. | |
| 2011/0296879 A1 | 12/2011 | Seo et al. | |
| 2020/0283944 A1 * | 9/2020 | Islas | D06F 23/02 |

FOREIGN PATENT DOCUMENTS

| | | | |
|---|---|---|---|
| KR | 20060130896 A | * | 12/2006 |
| KR | 20090079351 A | * | 7/2009 |
| KR | 101435828 B1 | | 8/2014 |
| KR | 101598097 B1 | | 2/2016 |

OTHER PUBLICATIONS

Machine translation of KR-20090079351-A to Jeon et al. (Year: 2009).*
Machine translation of KR-20060130896-A to Hong et al. (Year: 2006).*

* cited by examiner

*Primary Examiner* — Joseph L. Perrin
(74) *Attorney, Agent, or Firm* — Price Heneveld LLP

(57) ABSTRACT

A combination washing and drying appliance includes a tub positioned within an outer cabinet. A rotating drum includes a perforated wall. The rotating drum is rotationally operable within the tub. A blower delivers process air through an airflow path that includes a processing space within the rotating drum and an interstitial space defined between the tub and the rotating drum. An operable vent is selectively operable between a venting position and a closed position. The operable vent defines a passive flow of ambient air between the processing space and an area outside of the tub. The operable vent is operable to the closed position during a spin function of the rotating drum.

17 Claims, 7 Drawing Sheets

US 11,739,455 B2

VENTILATION VALVE AND CONTROL SYSTEM FOR VENTING FRESH AIR WITHIN A LAUNDRY APPLIANCE

FIELD OF THE DISCLOSURE

The present disclosure is in the field of laundry appliances, and more specifically, a vent assembly for the laundry appliance that is operable to allow a flow of fresh air into a processing space of the laundry appliance, when the appliance is not in use.

SUMMARY OF THE DISCLOSURE

According to one aspect of the present disclosure, a combination washing and drying appliance includes a tub positioned within an outer cabinet. A rotating drum includes a perforated wall. The rotating drum is rotationally operable within the tub. A blower delivers process air through an airflow path that includes a processing space within the rotating drum and an interstitial space defined between the tub and the rotating drum. An operable vent is selectively operable between a venting position and a closed position. The operable vent defines a passive flow of ambient air between the processing space and an area outside of the tub. The operable vent is operable to the closed position during a spin function of the rotating drum.

According to another aspect of the present disclosure, a laundry appliance includes a tub positioned within an outer cabinet. A rotating drum includes a perforated wall. An interstitial space is defined between the rotating drum and the tub and a processing space is defined within the rotating drum. An operable vent is selectively operable between a closed position and a venting position. The operable vent defines a passive flow of ambient air between the processing space, the interstitial space and an outside environment surround the tub. The operable vent is operable to the closed position during a spin function of the rotating drum.

According to yet another aspect of the present disclosure, an appliance includes a tub positioned within an outer cabinet. A rotating drum includes a perforated wall. An interstitial space is defined between the rotating drum and the tub. An operable vent is operable between a venting position and a closed position. The operable vent is in continual communication with the interstitial space via a pitot mechanism. The operable vent is in communication with the interstitial space via a vent space only when the operable vent is in the venting position. The venting position includes a plurality of open positions that are distal from the closed position.

These and other features, advantages, and objects of the present disclosure will be further understood and appreciated by those skilled in the art by reference to the following specification, claims, and appended drawings.

Figure 1:
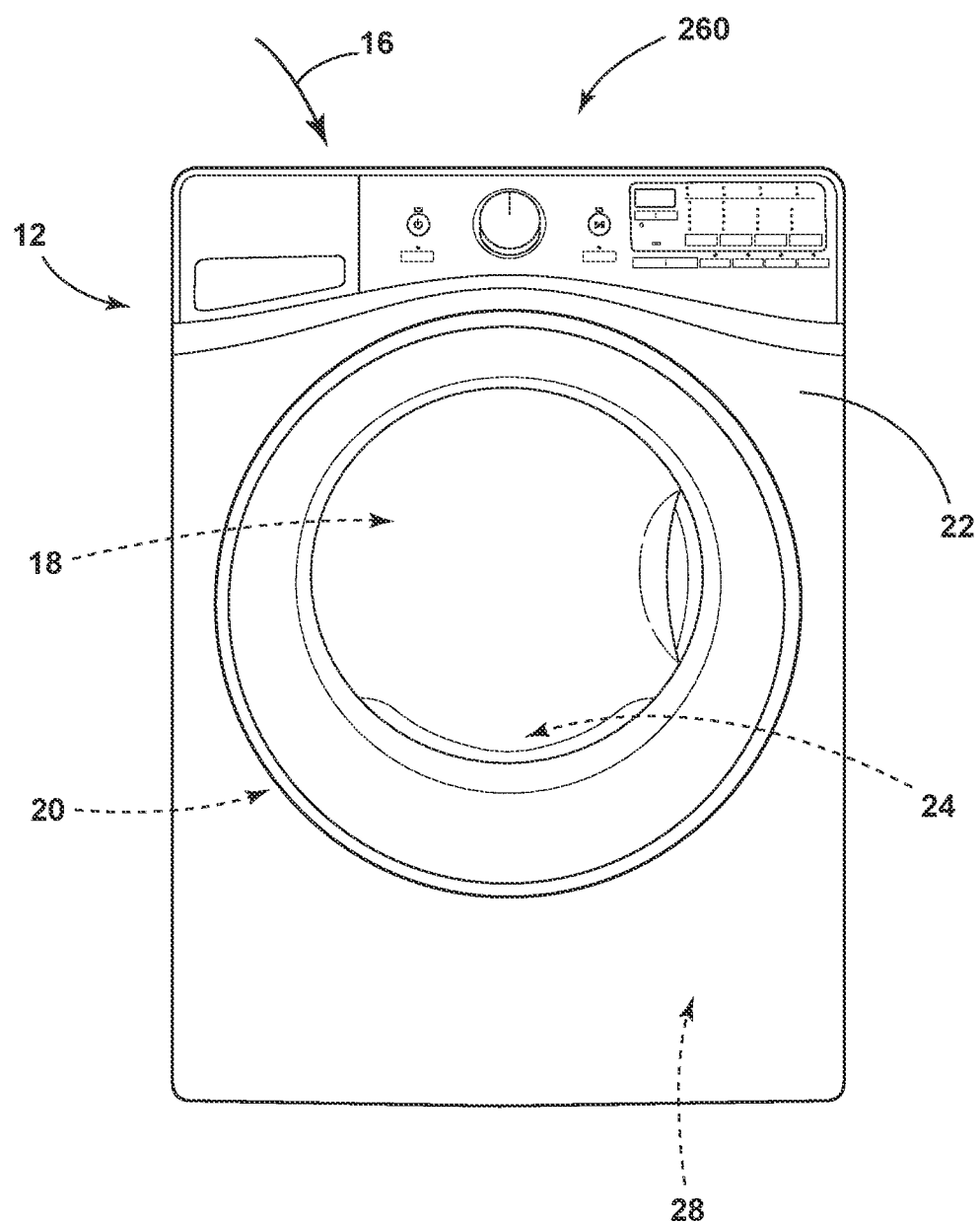
FIG. 1 is a front elevational view of a laundry appliance that incorporates an aspect of an operable vent for allowing a flow of fresh air into a processing space.

The components in the figures are not necessarily to scale, emphasis instead being placed upon illustrating the principles described herein.

DETAILED DESCRIPTION

The present illustrated embodiments reside primarily in combinations of method steps and apparatus components related to an appliance having a passively operable vent for allowing a flow of ambient air to move through the rotating drum. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-9, reference numeral 10 generally refers to an operable vent that is incorporated within a laundry appliance 12 for allowing for a flow 14 of ambient air 16 to move through a processing space 18 of the laundry appliance 12, when the laundry appliance 12 is not being used, or is being used at slow rotational speeds. In the various aspects of the device, the laundry appliance 12 is typically in the form of a combination washing and drying appliance where washing functions and drying functions may take place within the same processing space 18. It is also contemplated that the various aspects of the operable vent 10 disclosed herein can be used within drying appliances, washing appliances, refreshing appliances, and other similar appliance configurations.

Referring again to FIGS. 1-9, according to the various aspects of the device, the appliance 12 includes a tub 20 that is positioned within the outer cabinet 22. A rotating drum 24 is positioned within the tub 20, where the rotating drum 24 includes a perforated wall 26. The rotating drum 24 is rotationally operable within the tub 20. A blower 28 delivers process air 30 through an airflow path 32 that includes a processing space 18 that is defined within the rotating drum 24. This airflow path 32 also includes an interstitial space 34 that is defined between the tub 20 and the rotating drum 24. An operable vent 10 is selectively operable between a venting position 36 and a closed position 38. The operable vent 10 defines a passive flow 14 of ambient air 16 between the processing space 18 and an area outside of the tub 20 when the operable vent 10 is in the venting position 36. The operable vent 10 is operable to the closed position 38 during a spin function 40 of the rotating drum 24. The operable vent 10 includes a pitot mechanism 42 that extends from the interstitial space 34 defined between the tub 20 and the rotating drum 24 and into a diaphragm 44 contained within a valve body 46 of the operable vent 10. Rotation of the rotating drum 24 within the tub 20 during a spin function 40 generates a pitot pressure 48 that is delivered through the pitot mechanism 42 and into the diaphragm 44. This pitot pressure 48 expands the diaphragm 44 to engage a valve seat 50 of the valve body 46 to define the closed position 38 of the operable vent 10. At the conclusion of the spin function 40, the pitot pressure 48 diminishes and the diaphragm 44 returns to a resting state 52 that corresponds to one of the venting positions 36 of the operable vent 10. In the various venting positions 36, the passive flow 14 of ambient air 16 is allowed to enter and exit the processing space 18 via the operable vent 10. It is typical that the appliance 12 can include multiple operable vents 10 that are positioned at various locations on the tub 20 for the laundry appliance 12.

Referring now to FIGS. 2-7, the operable vent 10 is attached to a structural wall 70 that defines the tub 20, where the operable vent 10 extends into the interstitial space 34 defined between the tub 20 and the rotating drum 24. In this manner, the valve body 46 includes a vent port 72 that extends into the interstitial space 34 and allows for the passive flow 14 of ambient air 16 into and out from the processing space 18 of the rotating drum 24, through the perforated wall 26 and the interstitial space 34. The pitot mechanism 42 of the operable vent 10 includes an air scoop 74 that also extends into the interstitial space 34 between the tub 20 and the rotating drum 24. This air scoop 74 collects impact air pressure 76 from the interstitial space 34 during operation of a spin function 40 of the rotating drum 24. Typically, this spin function 40 necessary to produce the required pitot pressure 48 is in the form of a high-speed spin function 40, such as that used after a rinse cycle to extract excess moisture 78 or fluid from articles being processed. This high speed rotation of the rotating drum 24 within the tub 20 produces an increased level of pitot pressure 48 that can be delivered from the air scoop 74 and into the diaphragm 44 for moving the operable vent 10 to the closed position 38. In this closed position 38, moisture 78 that is extracted from the articles being processed can flow 14 in all directions out from the rotating drum 24 and into the interstitial space 34 to be collected within a drain assembly 80 of the appliance 12. By closing the operable vents 10, this extracted moisture 78 can be contained within the interstitial space 34 and can be directed to the drain assembly 80 for the appliance 12. When the spin function 40 is complete, the pitot pressure 48 decreases and the diaphragm 44 is able to return to the resting state 52 that is indicative of one or more of the venting positions 36 of the operable vent 10. The various venting positions 36 can be defined as any position of the operable vent 10 that is distal from the closed position 38. Stated another way, the venting position 36 of the operable vent 10 is defined by any position where a planar base 82 of the diaphragm 44 is separated from the valve seat 50 that is coupled with the vent port 72.

Referring again to FIGS. 3-7, the pitot mechanism 42 for the operable vent 10 includes a pitot tube 100 that extends from the air scoop 74 and to the valve body 46. Through this configuration, the impact air pressure 76 that is collected by the air scoop 74 can be delivered through the pitot tube 100 as pitot pressure 48 and into the valve body 46 by an inlet 102 that is contained within a valve cap 104.

Referring again to FIGS. 2-7, during operation of the operable vent 10 during a spin function 40 of the laundry appliance 12, the impact air pressure 76 is collected by the air scoop 74 to produce a pitot pressure 48 that is delivered from the air scoop 74 and into the inner volume 120 of the diaphragm 44 via the pitot tube 100. This pitot pressure 48 causes the planar base 82 of the diaphragm 44 to expand in a generally linear closing direction 122 toward the valve seat 50. During this deflection of the diaphragm 44 in the closing direction 122, a flexible portion 124 of the diaphragm 44 expands to allow for the movement of the planar base 82 of the diaphragm 44. The flexible portion 124 of the diaphragm 44 can include pleats, accordion ridges, and other similar flexible features 126 that allow for the expansion of the diaphragm 44 between the venting position 36 and the closed position 38 with respect to the valve seat 50.

During the spin function 40, the inner volume 120 of the diaphragm 44 expands to move the diaphragm 44 and the remainder of the operable vent 10 in the closing direction 122 and toward the closed position 38. In the closed position 38, the planar base 82 and the valve seat 50 forms a sealed engagement that limits the amount of air, such as ambient air 16 and process air 30, that can pass through the vent port 72 and through the operable vent 10. It is contemplated that the planar base 82 can include an elastomeric material, such that in the closed position 38, the engagement between the diaphragm 44 and the valve seat 50 defines an airtight seal, or a substantially airtight seal. Typically, the diaphragm 44 in the closed position 38 will form a watertight seal or a substantially watertight seal to prevent the expulsion of the extracted moisture 78 from the articles from being directed through the operable vent 10 during the spin function 40 of the appliance 12.

Referring again to FIGS. 2-7, when the spin function 40 is completed and the rotation of the drum 24 slows, the pitot pressure 48 that is delivered through the pitot mechanism 42 subsides and the volume of the diaphragm 44 is allowed to decrease. As this occurs, the planar base 82 of the diaphragm 44 operates in an opposing linear direction 140 that is opposite the closing direction 122. This is assisted through the inclusion of a bleed hole 142 that is defined within the planar base 82 of the diaphragm 44. This bleed hole 142 is used to allow air to escape to provide an expediting mechanism for moving the diaphragm 44 from the closed position 38 and back to the venting position 36 after the conclusion of a spin function 40. The bleed hole 142 is also used for allowing moisture 78 within the inner volume 120 of the diaphragm 44 to escape. Such moisture 78 may enter into the inner volume 120 of the diaphragm 44 via the air scoop 74 during operation of the spin function 40. The diaphragm 44 of the valve body 46 includes the bleed hole 142 to release the pitot pressure 48 and selectively return the diaphragm 44 to the venting position 36. As discussed herein, the venting position 36 includes a plurality of open positions that are distal or away from the closed position 38 of the diaphragm 44 with respect to the valve seat 50.

Referring again to FIGS. 3-7, the diaphragm 44 for the operable vent 10 is contained within a valve body 46 that surrounds the diaphragm 44. In this manner, the valve body 46 helps to direct the movement of the diaphragm 44 in a linear direction between the venting position 36 and the closed position 38 during operation of the spin function 40. The valve body 46 can include reinforcing walls 160 that extend from the valve cap 104 and to a lower wall 162 that is positioned proximate the valve seat 50 and the vent port 72. In addition, the valve body 46 and the valve cap 104 can define an attaching space 164 that assists in securing the diaphragm 44 within the valve body 46 of the operable vent 10. Using this attaching space 164 defined between the valve cap 104 and the valve body 46, the movement of air in the form of pitot pressure 48 from the interstitial space 34 and into the diaphragm 44 can be efficiently captured within the inner volume 120 of the diaphragm 44. After the conclusion of the spin function 40, the air within the inner volume 120 can escape back through the pitot mechanism 42, or escape through the bleed hole 142 defined within the planar base 82 of the diaphragm 44. Because the diaphragm 44 is sealed between the valve cap 104 and the valve body 46, the amount of pitot pressure 48 needed to move the diaphragm 44 between the venting position 36 and the closed position 38 can be calibrated to a consistent operating condition of the spin function 40 for the appliance 12.

By way of example, and not limitation, the pitot pressure 48 needed for moving the diaphragm 44 to the closed position 38 can be calibrated to correspond to a particular minimum rotational speed of the rotating drum 24 during the spin function 40 with respect to the tub 20. This minimum rotational speed can produce a desired impact air pressure 76 that is used to produce a minimum pitot pressure 48 for moving the diaphragm 44 to the closed position 38. Where the rotating drum 24 moves faster than this minimum speed, the bleed hole 142 can be used to express excessive pitot pressure 48 from the diaphragm 44 during operation of the spin function 40. This helps to assist the diaphragm 44 to return to the venting position 36 at the conclusion of the spin function 40.

Referring again to FIGS. 2-7, when the operable vent 10 is in the venting position 36, the vent space 180 through which the passive flow 14 of ambient air 16 can pass is defined between the planar base 82 of the diaphragm 44 and the valve seat 50. The passive flow 14 of ambient air 16 passes through this vent space 180 and then through gaps 182 defined between the reinforcing walls 160 of the valve body 46.

According to various aspects of the device, the tub 20 for the laundry appliance 12 can include a plurality of operable vents 10. Typically, these operable vents 10 are positioned to provide for the passive flow 14 of ambient air 16 without allowing fluid or other moisture 78 to escape the tub 20 during operation of the appliance 12. In this manner, it is typical that the operable vents 10 are positioned above a particular level of the tub 20 so that during a washing cycle or individual function of the washing cycle, fluid cannot be allowed to escape through the operable vents 10 when in the venting position 36.

Figure 2:
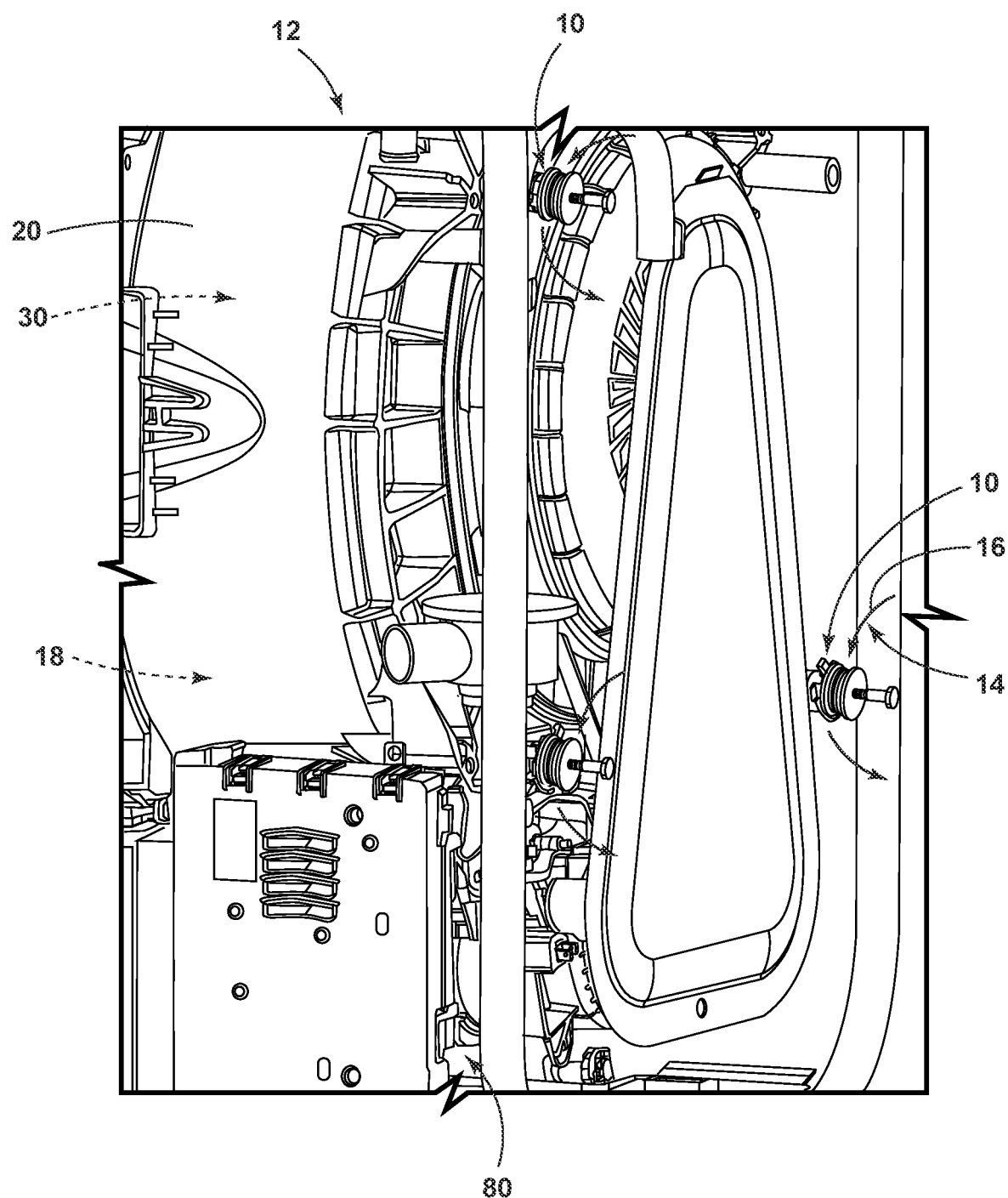
FIG. 2 is a rear perspective view of an aspect of a laundry appliance showing exemplary locations of operable vents, and illustrated with the outer cabinet removed.

As exemplified in FIG. 2, the operable vents 10 can be positioned within a back wall 200 of the tub 20. In this position, the impact air pressure 76 that is gathered by the air scoops 74 is collected in the interstitial space 34 between a rear wall 202 of the drum 24 (shown in FIG. 3) and the back wall 200 of the tub 20.

Figure 3:
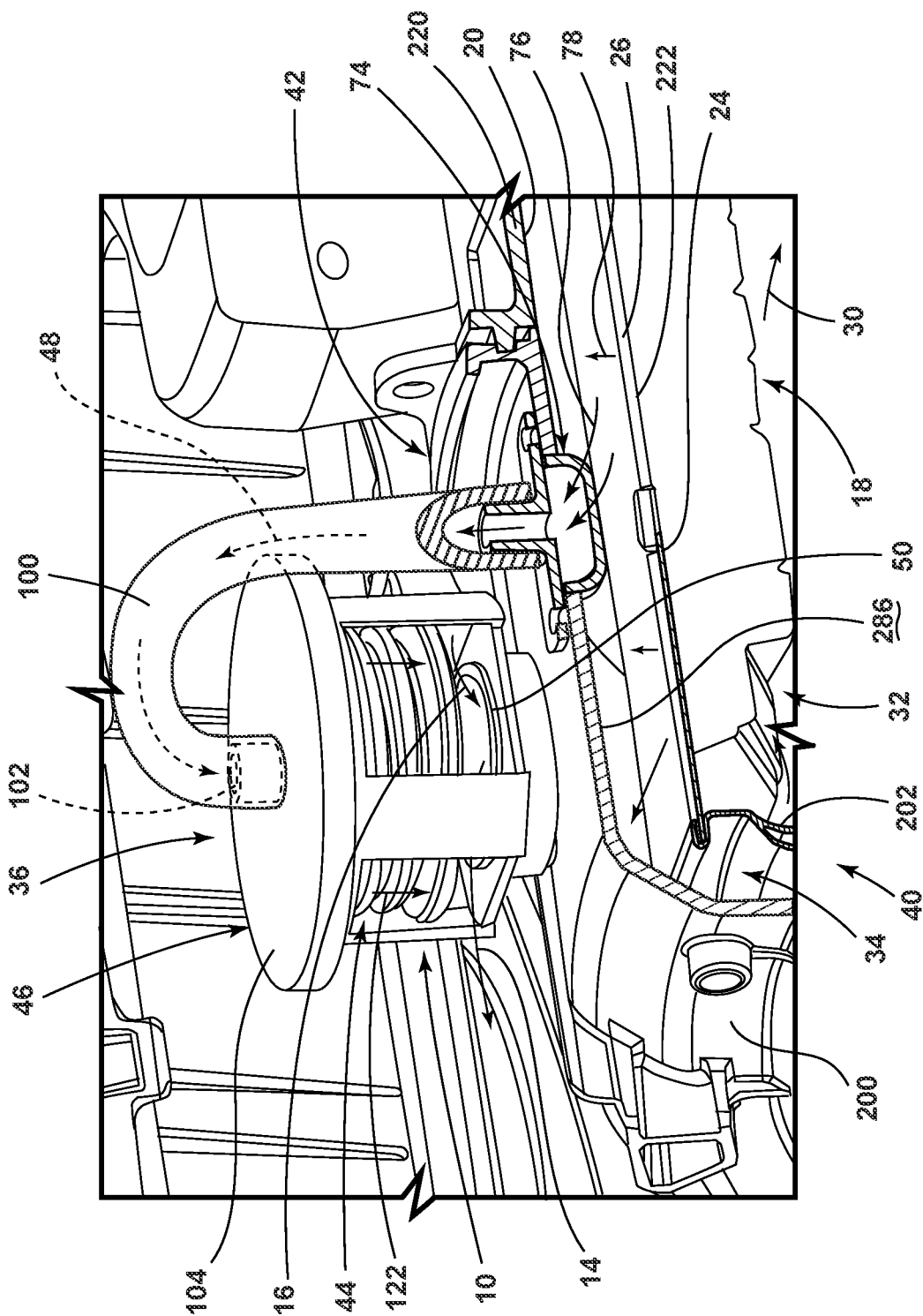
FIG. 3 is a side perspective view of an aspect of the operable vent shown in an exemplary location and coupled with a pitot mechanism for manipulating the operable vent.

As exemplified in FIG. 3, the operable vent 10 can be positioned on a cylindrical wall 220 of the tub 20. In this position, the operable vent 10 and the air scoop 74 is positioned proximate a cylindrical portion 222 of the perforated wall 26 for the rotating drum 24. In each of these configurations, the impact air pressure 76 produced within the interstitial space 34 is generated through the rotational operation of the rotating drum 24 within the tub 20 at a relatively high speed. This high-speed rotation of the drum 24 is typically produced during a spin function 40 of the laundry appliance 12.

Figure 8:
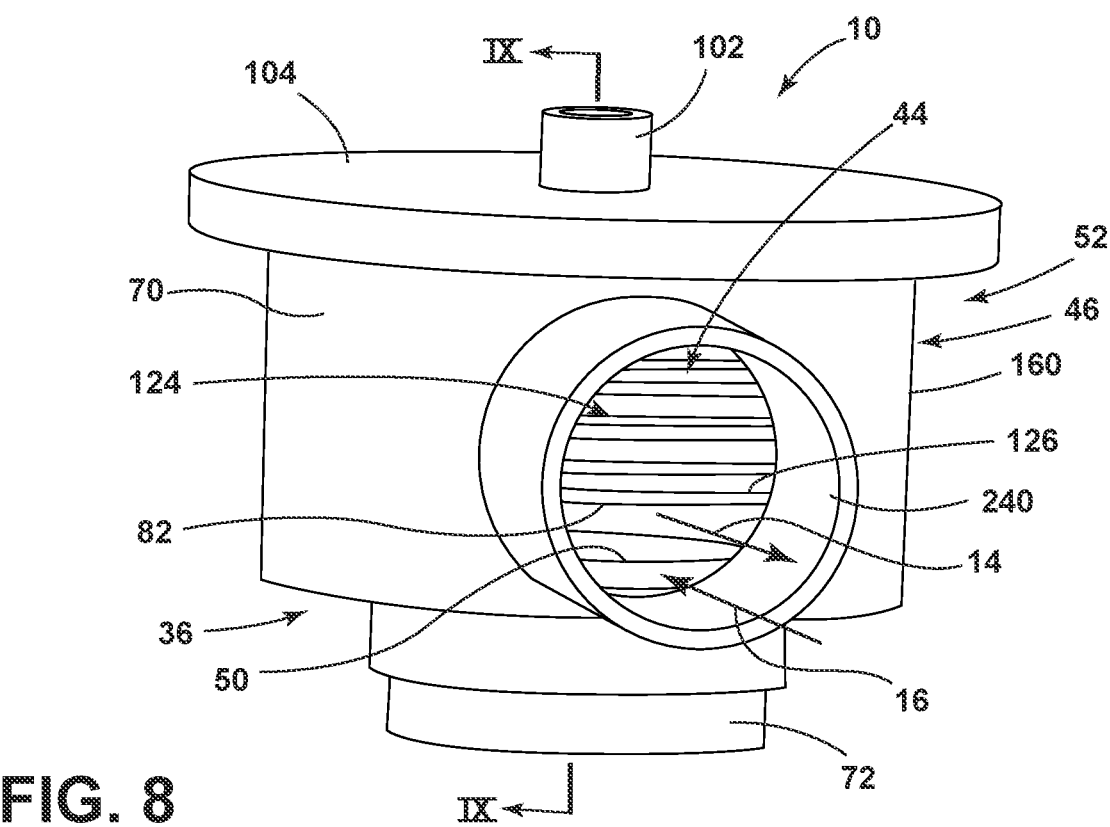
FIG. 8 is a side perspective view of an aspect of the operable vent and showing a side venting tube of the operable vent.
Figure 9:
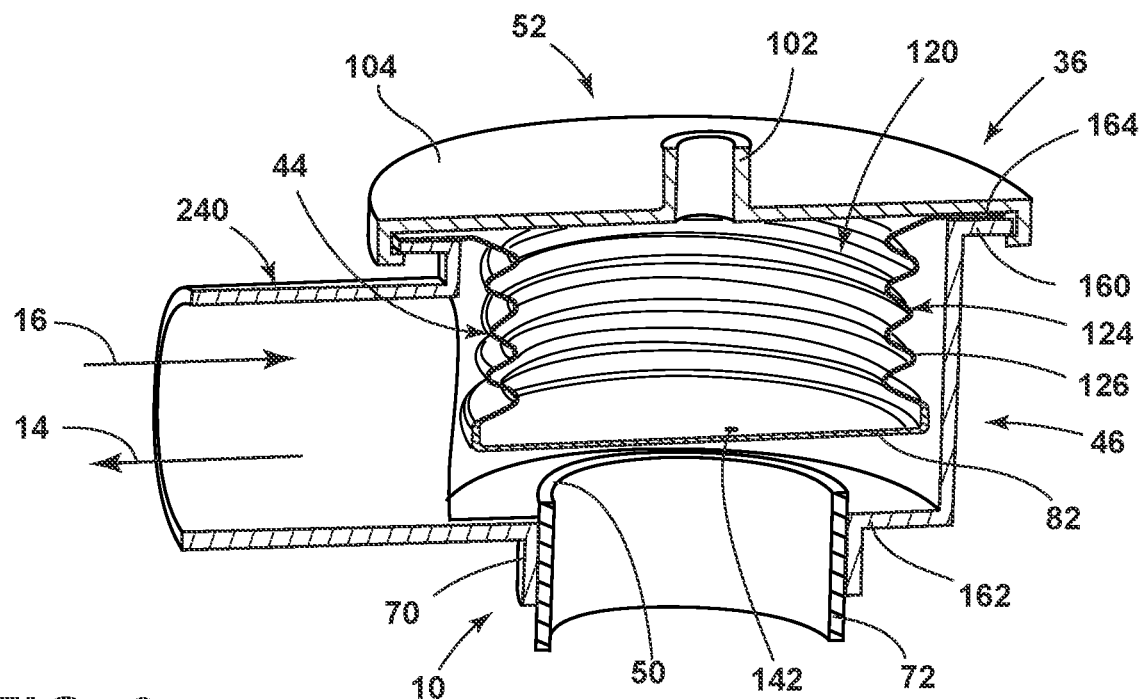
FIG. 9 is a cross-sectional view of the operable vent of FIG. 8 taken along line IX-IX.

According to various aspects of the device, as exemplified in FIGS. 8 and 9, the vent space 180 for the operable vent 10 can be defined through a vent tube 240 that extends in a predetermined direction from the valve body 46. Using this vent tube 240, the passive flow 14 of ambient air 16 can be directed through a particular opening within the appliance 12, typically, at a particular location within the outer cabinet 22 of the appliance 12. Using the vent tube 240, the passive flow 14 of ambient air 16 can be directed in a specified location to manage the passive flow 14 of ambient air 16 when the appliance 12 is not in use.

Referring again to FIGS. 1-9, the laundry appliance 12 includes the tub 20 that is positioned within the outer cabinet 22. The rotating drum 24 includes the perforated wall 26. The interstitial space 34 is defined between the rotating drum 24 and the tub 20. The operable vent 10 is selectively operable between the closed position 38 and the venting position 36. The operable vent 10 provides for the passive flow 14 of ambient air 16 between the processing space 18, the interstitial space 34, and an outside environment 260 surrounding the tub 20 and the outer cabinet 22 when the operable vent 10 is in the venting position 36. The operable vent 10 is operable to the closed position 38 during a spin function 40 of the rotating drum 24. Using the pitot mechanism 42 of the operable vent 10, a pitot pressure 48 can be delivered from the interstitial space 34 between the rotating drum 24 and the tub 20, through a pitot tube 100 and into a diaphragm 44 contained within the valve body 46. Rotation of the rotating drum 24 during a spin function 40 generates this pitot pressure 48 using the collected impact air pressure 76 for producing this pitot pressure 48. This pitot pressure 48 is delivered into the diaphragm 44 for expanding the diaphragm 44 to engage the valve seat 50 of the valve body 46. This engagement between the diaphragm 44 and the valve seat 50 defines the closed position 38 of the operable vent 10.

As exemplified in FIGS. 3-7, the pitot mechanism 42 includes the air scoop 74 that extends into the interstitial space 34 to collect the impact air pressure 76 from the interstitial space 34 during the high speed rotation of the rotating drum 24. The pitot mechanism 42 directs this impact air pressure 76 into the pitot pressure 48 for delivery into the inner volume 120 of the diaphragm 44. As discussed herein, this pitot pressure 48 that is delivered into the inner volume 120 of the diaphragm 44 expands the diaphragm 44 to define the closed position 38 of the operable vent 10.

Referring again to FIGS. 1-9, the tub 20 is positioned within the outer cabinet 22. The rotating drum 24 includes a perforated wall 26 and an interstitial space 34 is defined between the rotating drum 24 and the tub 20. The operable vent 10 is operable between the venting position 36 and the closed position 38. The operable vent 10 is in a continual communication with the interstitial space 34 via the pitot mechanism 42. This communication between the operable vent 10 and the interstitial space 34 occurs via the vent space 180 between the diaphragm 44 and the valve seat 50 when the operable vent 10 is in the venting position 36. When the operable vent 10 is in the closed position 38, communication between the operable vent 10 and the interstitial space 34 via the vent space 180 is blocked by the engagement between the planar base 82 of the diaphragm 44 and the vent seat. As discussed herein, the venting position 36 includes a plurality of open positions that are distal from the closed position 38.

Referring again to FIGS. 1-9, communication between the interstitial space 34 and the operable vent 10 is also defined between the pitot mechanism 42 and the interior volume of the diaphragm 44. The pitot mechanism 42 includes the air scoop 74 that is positioned within the interstitial space 34. The pitot tube 100 extends from the air scoop 74 to the inlet 102 of the valve cap 104 for the operable vent 10. Rotation of the rotating drum 24 during the spin function 40 generates the pitot pressure 48 that expands the diaphragm 44 of the operable vent 10 to the closed position 38. As discussed herein, in the closed position 38, the planar base 82 of the diaphragm 44 engages the valve seat 50 and blocks the vent space 180 to prevent the passage of air between the processing space 18 within the tub 20 of the rotating drum 24 and the outside atmosphere via the operable vent 10. Typically, the bleed hole 142 provides for a limited amount of airflow or fluid drainage through the planar base 82 and between the inner volume 120 of the diaphragm 44 and the interstitial space 34 when the operable vent 10 is in the closed position 38.

According to the various aspects of the device, the operable vent 10 is utilized for maintaining a passive flow 14 of ambient air 16 between the processing space 18 and the outside environment 260 in various conditions of the appliance 12. Typically, the operable vents 10 are designed to be in the venting position 36 when the appliance 12 is not being used. It is also contemplated that the operable vents 10 are in the venting position 36 when the appliance 12 is operating the rotating drum 24 at a slow rate of speed. These slow rates of speed are typically utilized during agitating functions of a washing phase, fill stages of a washing phase, tumbling stages of a drying phase, and other similar phases where the rotating drum 24 is not moving at a high rate of speed, such as in a spin function 40. The operable vent 10 in the venting position 36 provides for the passive flow 14 of ambient air 16 through the processing space 18. This passive flow 14 of ambient air 16 can prevent a buildup of noxious gasses that may accumulate if a living organism is within the processing space 18.

The configuration of the operable vents 10 is designed to provide for the passive flow 14 of ambient air 16. Also, the operable vents 10 are designed to prevent the flow 14 of fluid through the operable vents 10 during operation of the appliance 12. Accordingly, during a spin function 40, when fluid is most likely to be directed toward the entire interior surface of the tub 20, the operable vents 10 are in a closed position 38. As discussed herein, during a spin function 40 of the laundry appliance 12, fluid extracted from damp articles within the processing space 18 is extracted in all directions. Such water can engage the air scoop 74, the vent port 72, and other portions of the operable vent 10 that extend into the interstitial space 34. During this spin function 40 of the appliance 12, the operable vent 10 is in the closed position 38 to prevent this fluid from leaving the operable vent 10 through the vent space 180, vent tube 240, or other portion of the operable vent 10 that may lead away from the tub 20. Through this configuration, moisture 78 that is extracted from the articles can be directed along the inner surface 286 of the tub 20 and toward a drain system for the appliance 12.

Figure 4:
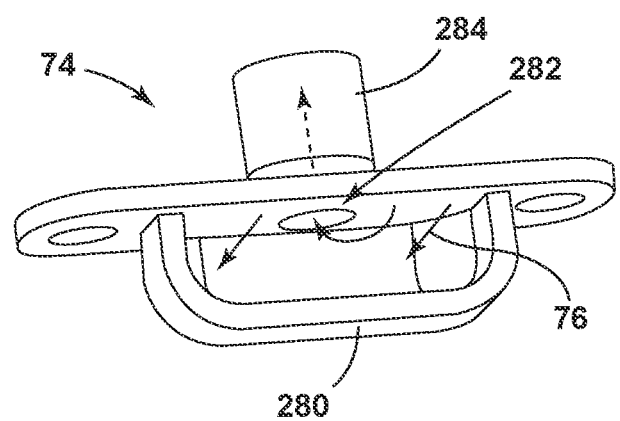
FIG. 4 is a side perspective view of an air scoop that is incorporated within the pitot mechanism of the operable vent.
Figure 5:
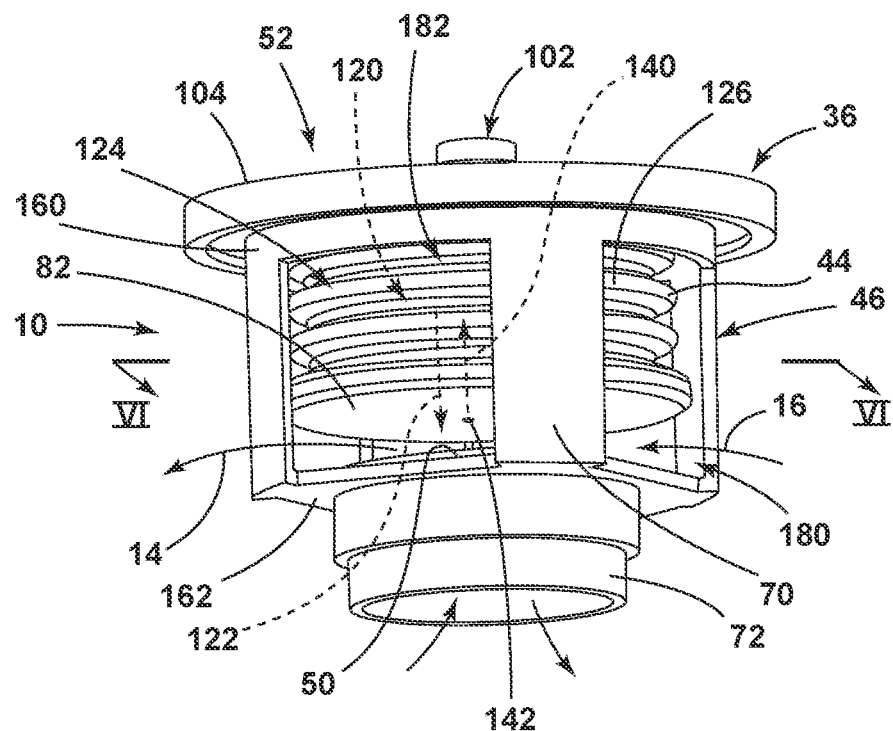
FIG. 5 is a side perspective view of an aspect of the operable vent and showing the diaphragm in a venting position.
Figure 6:
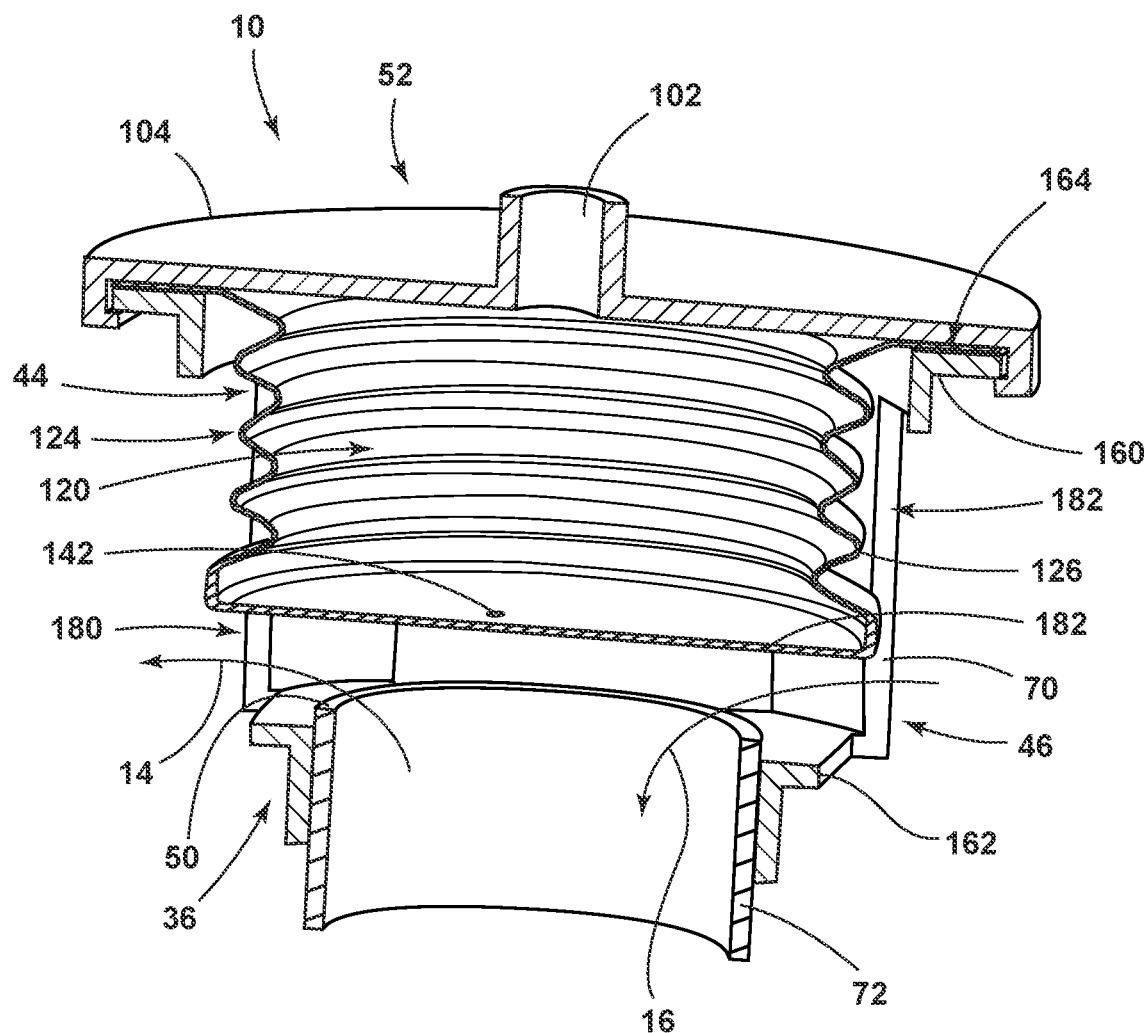
FIG. 6 is a cross-sectional view of the operable vent of FIG. 3 taken along line VI-VI and showing the diaphragm in the venting position.
Figure 7:
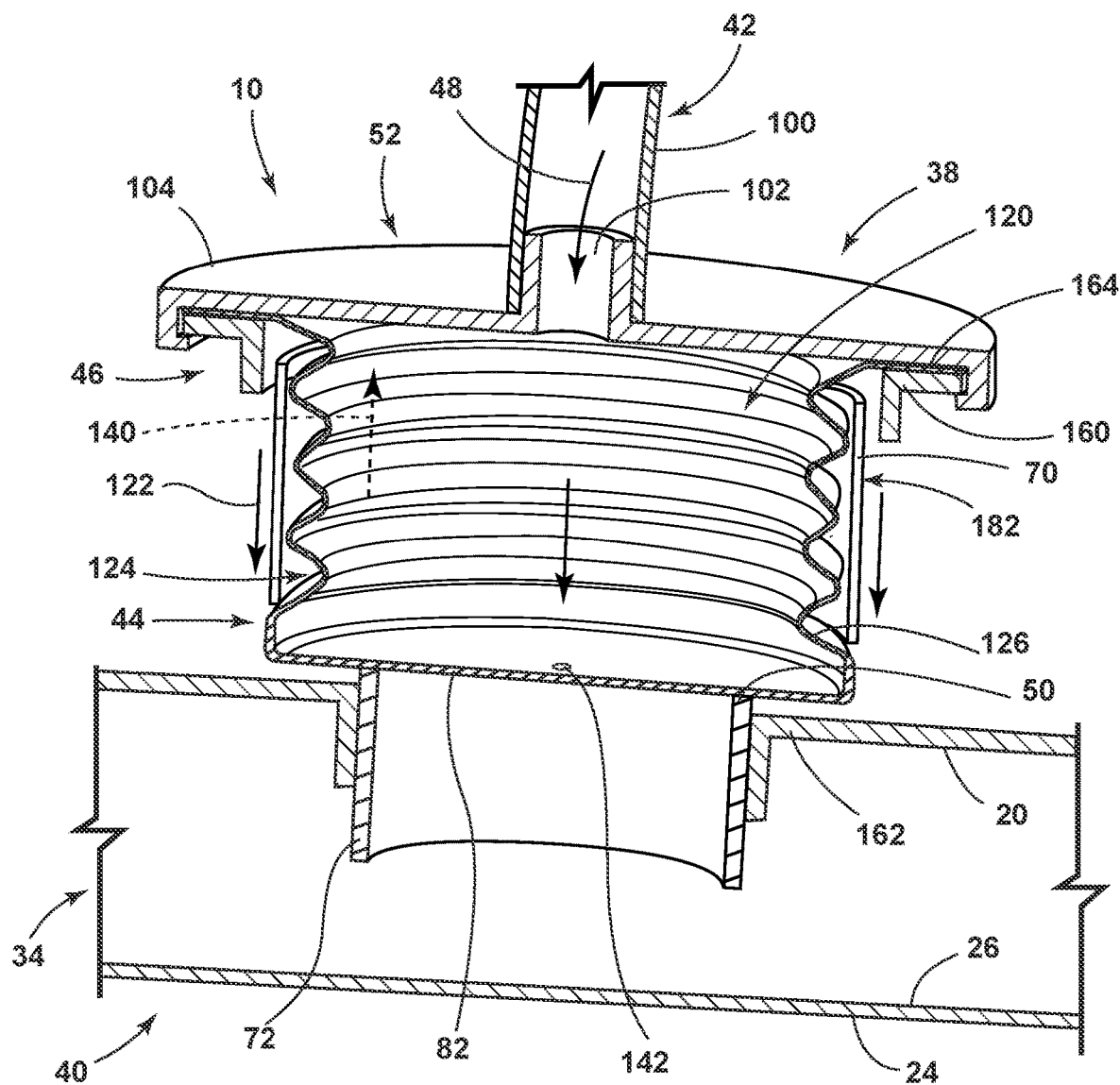
FIG. 7 is a cross-sectional view of the operable vent of FIG. 6 and showing the operable vent in a closed position.

Referring now to FIG. 4, the air scoop 74 that is attached to the tub 20 for defining a portion of the pitot mechanism 42 can be attached to an exterior surface of the tub 20. The scoop portion 280 of the air scoop 74 extends into the interstitial space 34. This scoop portion 280 defines a transition 282 that serves to collect the impact air pressure 76 during the spin function 40 of the laundry appliance 12. The impact air pressure 76 is collected within the scoop portion 280 and is moved through a collection tube 284 that leads to the pitot tube 100. This configuration of the air scoop 74 can receive certain moisture 78 that is extracted from the articles being collected within the scoop portion 280. The collection tube 284 is oriented generally perpendicular to the scoop portion 280 so that moisture 78 collected by the scoop portion 280 is generally not able to move into the collection tube 284 of the air scoop 74. Through this configuration, moisture 78 extracted by the spin function 40 can be maintained within the inner surface 286 of the tub 20 and within the interstitial space 34 defined between the rotating drum 24 and the tub 20. As discussed herein, moisture 78 that may become disposed within the diaphragm 44 can be directed back into the interstitial space 34 via the bleed hole 142 defined within the planar base 82 of the diaphragm 44.

According to another aspect of the present disclosure, a combination washing and drying appliance includes a tub positioned within an outer cabinet. A rotating drum includes a perforated wall. The rotating drum is rotationally operable within the tub. A blower delivers process air through an airflow path that includes a processing space within the rotating drum and an interstitial space defined between the tub and the rotating drum. An operable vent is selectively operable between a venting position and a closed position. The operable vent defines a passive flow of ambient air between the processing space and an area outside of the tub. The operable vent is operable to the closed position during a spin function of the rotating drum.

According to another aspect, the operable vent includes a pitot mechanism that extends from the interstitial space to a diaphragm contained within a valve body. Rotation of the rotating drum during the spin function generates a pitot pressure that expands the diaphragm to engage a valve seat of the valve body to define the closed position of the operable vent.

According to yet another aspect, the pitot mechanism includes an air scoop that collects impact air pressure from the interstitial space and directs the impact air pressure into the pitot pressure for operating the diaphragm.

According to another aspect of the present disclosure, the air scoop extends into the interstitial space.

According to another aspect, the pitot mechanism includes a pitot tube that extends from the air scoop to the valve body.

According to yet another aspect, the valve body includes a bleed hole to release pitot pressure and selectively return the diaphragm to the venting position. The venting position includes a plurality of open positions that are distal from the closed position.

According to another aspect of the present disclosure, a vent space is defined between the diaphragm and the valve seat when the diaphragm is in the venting position.

According to another aspect, the tub includes a plurality of operable vents.

According to yet another aspect, the operable vent is positioned to provide for the passive flow of ambient air without allowing water to escape the tub.

According to another aspect of the present disclosure, the operable vent is positioned on a rear wall of the tub proximate the perforated wall of the rotating drum.

According to another aspect, the operable vent is positioned on a cylindrical wall of the tub proximate a cylindrical portion of the perforated wall of the rotating drum.

According to yet another aspect, a laundry appliance includes a tub positioned within an outer cabinet. A rotating drum includes a perforated wall. An interstitial space is defined between the rotating drum and the tub and a processing space is defined within the rotating drum. An operable vent is selectively operable between a closed position and a venting position. The operable vent defines a passive flow of ambient air between the processing space, the interstitial space and an outside environment surround the tub. The operable vent is operable to the closed position during a spin function of the rotating drum.

According to another aspect of the present disclosure, the operable vent includes a pitot mechanism that extends from the interstitial space, through a pitot tube and to a diaphragm contained within a valve body. Rotation of the rotating drum during the spin function generates a pitot pressure that expands the diaphragm to engage a valve seat of the valve body to define the closed position of the operable vent.

According to another aspect, the pitot mechanism includes an air scoop that extends into the interstitial space and collects impact air pressure from the interstitial space and directs the impact air pressure into the pitot pressure for operating the diaphragm.

According to yet another aspect, a vent space is defined between the diaphragm and the valve seat in the venting position.

According to another aspect of the present disclosure, the operable vent is positioned on a rear wall of the tub proximate the perforated wall of the rotating drum.

According to another aspect, the operable vent is positioned on a cylindrical wall of the tub proximate a cylindrical portion of the perforated wall of the rotating drum.

According to yet another aspect, an appliance includes a tub positioned within an outer cabinet. A rotating drum includes a perforated wall. An interstitial space is defined between the rotating drum and the tub. An operable vent is operable between a venting position and a closed position. The operable vent is in continual communication with the interstitial space via a pitot mechanism. The operable vent is in communication with the interstitial space via a vent space only when the operable vent is in the venting position. The venting position includes a plurality of open positions that are distal from the closed position.

According to another aspect of the present disclosure, the pitot mechanism includes an air scoop positioned in the interstitial space and a pitot tube that extends from the air scoop to the operable vent. Rotation of the rotating drum during a spin function generates a pitot pressure that expands a diaphragm of the operable vent that blocks the vent space to define the closed position of the operable vent.

According to another aspect, the air scoop collects impact air pressure from the interstitial space and directs the impact air pressure into the pitot pressure for operating the diaphragm.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A combination washing and drying appliance comprising:
   a tub positioned within an outer cabinet;
   a rotating drum having a perforated wall, wherein the rotating drum is rotationally operable within the tub;
   a blower that delivers process air through an airflow path that includes a processing space within the rotating drum and an interstitial space defined between the tub and the rotating drum; and an operable vent that is selectively operable between a venting position and a closed position in response to operation of the rotating drum, wherein the operable vent in the venting position defines a passive flow of ambient air between the processing space and an area outside of the tub, and wherein the operable vent is operable to the closed position during a spin function of the rotating drum, wherein the operable vent includes a pitot mechanism that extends from the interstitial space to a diaphragm contained within a valve body, wherein rotation of the rotating drum during the spin function generated a pitot pressure that expands the diaphragm to engage a valve seat of the valve body to define the closed position of the operable vent.

2. The combination washing and drying appliance of claim 1, wherein the pitot mechanism includes an air scoop that collects impact air pressure from the interstitial space and directs the impact air pressure into the pitot pressure for operating the diaphragm.

3. The combination washing and drying appliance of claim 2, wherein the air scoop extends into the interstitial space.

4. The combination washing and drying appliance of claim 2, wherein the pitot mechanism includes a pitot tube that extends from the air scoop to the valve body.

5. The combination washing and drying appliance of claim 2, wherein the valve body includes a bleed hole to release pitot pressure and selectively return the diaphragm to the venting position, wherein the venting position includes a plurality of open positions that are distal from the closed position.

6. The combination washing and drying appliance of claim 1, wherein a vent space is defined between the diaphragm and the valve seat when the diaphragm is in the venting position.

7. The combination washing and drying appliance of claim 1, wherein the tub includes a plurality of operable vents.

8. The combination washing and drying appliance of claim 1, wherein the operable vent is positioned to provide for the passive flow of ambient air without allowing water to escape the tub.

9. The combination washing and drying appliance of claim 1, wherein the operable vent is positioned on a rear wall of the tub proximate the perforated wall of the rotating drum.

10. The combination washing and drying appliance of claim 1, wherein the operable vent is positioned on a cylindrical wall of the tub proximate a cylindrical portion of the perforated wall of the rotating drum.

11. A laundry appliance comprising:
a tub positioned within an outer cabinet;
a rotating drum having a perforated wall, wherein an interstitial space is defined between the rotating drum and the tub and a processing space is defined within the rotating drum; and
an operable vent that is selectively operable between a closed position and a venting position in response to operate of the rotating drum, wherein the operable vent in the venting position defines a passive flow of ambient air between the processing space, the interstitial space and an outside environment surrounding the tub, and wherein the operable vent is operable to the closed position during a spin function of the rotating drum, wherein the operable vent includes a pitot mechanism that extends from the interstitial space, through a pitot tube and to a diaphragm contained within a valve body, wherein rotation of the rotating drum during the spin function generated a pitot pressure that expands the diaphragm to engage a valve seat of the valve body to define the closed position of the operable vent.

12. The laundry appliance of claim 11, wherein the pitot mechanism includes an air scoop that extends into the interstitial space and collects impact air pressure from the interstitial space and directs the impact air pressure into the pitot pressure for operating the diaphragm.

13. The laundry appliance of claim 11, wherein a vent space is defined between the diaphragm and the valve seat in the venting position.

14. The laundry appliance of claim 11, wherein the operable vent is positioned on a rear wall of the tub proximate the perforated wall of the rotating drum.

15. The laundry appliance of claim 11, wherein the operable vent is positioned on a cylindrical wall of the tub proximate a cylindrical portion of the perforated wall of the rotating drum.

16. An appliance comprising:
a tub positioned within an outer cabinet;
a rotating drum having a perforated wall, wherein an interstitial space is defined between the rotating drum and the tub; and
an operable vent that is operable between a venting position and a closed position, wherein the operable vent is in continual communication with the interstitial space via a pitot tube, and wherein the operable vent is in communication with the interstitial space via a vent space only when the operable vent is in the venting position, wherein the venting position includes a plurality of open positions that are distal from the closed position, wherein a pitot mechanism includes an air scoop positioned in the intersitial space and the pitot tube that extends from the air scoop to the operable vent, wherein rotation of the rotating drum during a spin function generates a pitot pressure that expands a diaphragm of the operable vent that blocks the vent space to define the closed position of the operable vent.

17. The appliance of claim 16, wherein the air scoop collects impact air pressure from the interstitial space and directs the impact air pressure into the pitot pressure for operating the diaphragm.

* * * * *